United States Patent [19]
Shaffer et al.

[11] Patent Number: 6,005,047
[45] Date of Patent: Dec. 21, 1999

[54] MOISTURE-CURABLE COMPOUNDS CONTAINING ISOCYANATE AND ALKOXYSILANE GROUPS

[75] Inventors: Myron W. Shaffer, New Cumberland, W. Va.; Richard R. Roesler, Wexford, Pa.; Lutz Schmalstieg, Cologne, Germany

[73] Assignees: Bayer Corporation, Pittsburgh, Pa.; Bayer Aktiengesellschaft, Leverkusen, Germany

[21] Appl. No.: 09/172,751

[22] Filed: Oct. 14, 1998

[51] Int. Cl.[6] .................. C08J 3/00; C08K 3/20; C08L 75/00; C08L 83/00; C08G 77/04
[52] U.S. Cl. .................. 524/590; 524/588; 524/589; 528/28; 528/44
[58] Field of Search .................. 524/588, 589, 524/590; 528/28, 44

[56] References Cited

U.S. PATENT DOCUMENTS

| | | | |
|---|---|---|---|
| 3,420,800 | 1/1969 | Haggis | 260/75 |
| 3,567,692 | 3/1971 | Haggis et al. | 260/75 |
| 4,067,844 | 1/1978 | Barron et al. | 260/37 N |
| 4,625,012 | 11/1986 | Rizk et al. | 528/28 |
| 5,364,955 | 11/1994 | Zwiener et al. | 556/418 |

*Primary Examiner*—Patrick D. Niland
*Attorney, Agent, or Firm*—Joseph C. Gil; Thomas W. Roy

[57] ABSTRACT

The present invention relates to moisture-curable compounds which
a) have a content of (cyclo)aliphatically-bound isocyanate groups (calculated as NCO, MW 42) of 0.2 to 30% by weight and a content of alkoxysilane groups (calculated as Si, MW 28) of 0.2 to 4.5% by weight,
b) optionally contain repeating ethylene oxide units and
c) have an equivalent ratio of (cyclo)aliphatically-bound isocyanate groups to alkoxy groups, which are bound to Si, of 1.0:0.05 to 1.0:1.4, wherein the preceding percentages are based on the weight of the moisture-curable compounds and wherein the alkoxysilane groups are incorporated as the reaction products of polyisocyanates with amino compounds corresponding to formula I

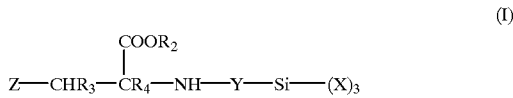

The present invention also relates to coating, adhesive or sealing compositions containing these moisture-curable compounds as the binder.

19 Claims, No Drawings

MOISTURE-CURABLE COMPOUNDS CONTAINING ISOCYANATE AND ALKOXYSILANE GROUPS

BACKGROUND OF THE INVENTION

1. Field of the Invention

The present invention relates to moisture-curable compounds containing (cyclo)aliphatically-bound isocyanate groups and alkoxysilane groups incorporated through aspartate groups, which can be cured in the presence of moisture to form coatings, adhesives and sealants.

2. Description of the Prior Art

It is known that polyisocyanate resins are curable in the presence of atmospheric moisture to form polyurea coatings. During the curing mechanism an isocyanate group reacts with moisture to form an amino group, which then reacts with another isocyanate group to form a urea group. One of the disadvantages of these moisture-curable resins is that the curing mechanism is relatively slow.

It has been suggested in U.S. Pat. Nos. 3,420,800 and 3,567,692 that the curing rate of moisture-curable polyisocyanates can be increased by incorporating either aldimines or ketimines. It is stated that the reaction of moisture with an aldimine or ketimine to form the corresponding amine is faster than the reaction of moisture with an isocyanate group to form an amine. A disadvantage of the use of aldimines and ketimines to accelerate the cure of polyisocyanates is that it requires the preparation of an additional component and requires some type of metering equipment to ensure that the two components are blended in the proper proportions.

It is an object of the present invention to increase the curing rate of moisture-curable polyisocyanates without the need for a co-reactant.

This object may be achieved with the polyisocyanates according to the present invention, which have been modified to contain alkoxysilane silane groups incorporated through aspartate groups. The faster curing rates obtained according to the present invention are surprising because alkoxysilane groups, which are also curable in the presence of moisture, cure more slowly than polyisocyanates. However, when both isocyanate groups and alkoxysilane groups are present, a faster curing rate is obtained.

Copending application, U.S. Ser. No. 09/058,072, discloses water dispersible compounds containing isocyanate and alkoxysilane groups. The water dispersible compounds must be prepared from a polyisocyanate component having a minimum average functionality of 2.4 and be rendered water dispersible by the use of either ionic or nonionic hydrophilic groups.

Copending application, U.S. Ser. No. 08/992,163, discloses the preparation of polyurethane-urea dispersions containing alkoxysilane groups incorporated through aspartate groups. However, because the resulting polyurethane dispersions are dispersed in water, they do not contain any unreacted isocyanate groups.

SUMMARY OF THE INVENTION

The present invention relates to moisture-curable compounds which a) have a content of (cyclo)aliphatically-bound isocyanate groups (calculated as NCO, MW 42) of 0.2 to 30% by weight and a content of alkoxysilane groups (calculated as Si, MW 28) of 0.2 to 4.5% by weight, b) optionally contain repeating ethylene oxide units and c) have an equivalent ratio of (cyclo)aliphatically-bound isocyanate groups to alkoxy groups, which are bound to Si, of 1.0:0.05 to 1.0:1.4, wherein the preceding percentages are based on the weight of the moisture-curable compounds and wherein the alkoxysilane groups are incorporated as the reaction products of polyisocyanates with amino compounds corresponding to formula I

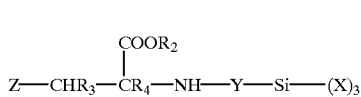

(I)

wherein

X represents identical or different organic groups which are inert to isocyanate groups below 100° C., provided that at least one of these groups is an alkoxy group, Y represents a linear or branched alkylene radical containing 1 to 8 carbon atoms, Z represents $COOR_1$ or an aromatic ring, $R_1$ and $R_2$ are identical or different and represent organic groups which are inert to isocyanate groups at a temperature of 100° C. or less and $R_3$ and $R_4$ are identical or different and represent hydrogen or organic groups which are inert to isocyanate groups at a temperature of 100° C. or less.

The present invention also relates to coating, adhesive or sealing compositions containing these moisture-curable compounds as the binder.

DETAILED DESCRIPTION OF THE INVENTION

The compounds according to the present invention are based on the reaction products of polyisocyanates containing (cyclo)aliphatically-bound isocyanate groups, compounds containing alkoxysilane groups and aspartate groups and optionally compounds containing ethylene oxide units and isocyanate-reactive groups, preferably hydroxy groups. The alkoxysilane groups are incorporated in the form of urea groups, while the hydrophilic groups are generally incorporated in the form of urethane groups.

The moisture-curable compounds have a) a content of alkoxysilane groups (calculated as Si, MW 28) of 0.2 to 4.5% by weight, preferably 0.2 to 4% and more preferably 0.5 to 3.5%, b) a content of (cyclo)aliphatically-bound isocyanate groups (calculated as NCO, MW 42) of 0.2 to 30% by weight, preferably 0.5 to 20% by weight and more preferably 1.0 to 15% by weight and c) optionally an ethylene oxide group content (calculated as $CH_2$—$CH_2$—O, MW 44) of 5 to 35% by weight, preferably 5 to 30% by weight and more preferably 10 to 25% by weight, wherein the preceding percentages are based on the weight of the moisture-curable compounds.

Suitable compounds containing alkoxysilane groups and amino groups, which may be used to prepare the moisture-curable compounds, include those corresponding to formula I wherein X represents identical or different organic groups which are inert to isocyanate groups below 100° C., provided that at least one of these groups is an alkoxy group, preferably alkyl or alkoxy groups having 1 to 4 carbon atoms and more preferably alkoxy groups, Y represents a linear or branched alkylene radical containing 1 to 8 carbon atoms, preferably a linear radical containing 2 to 4 carbon atoms or a branched radical containing 5 to 6 carbon atoms, more preferably a linear radical containing 3 carbon atoms, Z represents COOR$_1$ or an aromatic ring, preferably COOR$_1$, R$_1$ and R$_2$ are identical or different and represent organic groups which are inert to isocyanate groups at a temperature of 100° C. or less, preferably alkyl groups having 1 to 9 carbon atoms, more preferably methyl, ethyl or butyl groups, and R$_3$ and R$_4$ are identical or different and represent hydrogen or organic groups which are inert to isocyanate groups at a temperature of 100° C. or less, preferably hydrogen.

Especially preferred are compounds in which X represents methoxy, ethoxy groups or propoxy groups, more preferably methoxy or ethoxy groups and most preferably methoxy groups.

The compounds of formula I are prepared by reacting aminoalkyl alkoxysilanes corresponding to formula II

with maleic, fumaric or cinnamic acid esters corresponding to formula III

Examples of suitable aminoalkyl alkoxysilanes of formula II include 2-aminoethyl-dimethylmethoxy-silane; 6-aminohexyl-tributoxysilane; 3-aminopropyl-trimethoxysilane; 3-aminopropyl-triethoxysilane; 3-aminopropyl-methydiethoxysilane; 5-aminopentyl-trimethoxysilane; 5-aminopentyl-triethoxysilane, 3-aminopropyl-triisopropoxysilane and 4-amino-3,3-dimethylbutyldimethoxymethylsilane. 4-amino-3,3-dimethylbutyldimethoxymethylsilane is preferred and 3-aminopropyl-trimethoxysilane and 3-aminopropyl-triethoxysilane are especially preferred.

Examples of optionally substituted maleic, fumaric or cinnamic acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; the methyl, ethyl and butyl esters of cinnamic acid; and the corresponding maleic, fumaric and cinnamic acid esters substituted by methyl in the 2- and/or 3-position. The dimethyl, diethyl and dibutyl esters of maleic acid are preferred and the diethyl and dibutyl esters are especially preferred.

The reaction of primary amines with maleic, fumaric or cinnamic acid esters to form the aspartates of formula I is known and described, e.g. in U.S. Pat. No. 5,364,955, which is herein incorporated by reference. The preparation of the aspartates may be carried out, for example, at a temperature of 0 to 100° C. using the starting materials in such proportions that at least 1, preferably 1, olefinic double bond is present for each primary amino group. Excess starting materials may be removed by distillation after the reaction. The reaction may be carried out with or without a solvent, but the use of a solvent is less preferred. If a solvent is used, dioxane is an example of a suitable solvent. The compounds of formula I are colorless to pale yellow. They may be reacted with polyisocyanate component to form the compounds containing urea and alkoxysilane groups without further purification.

Suitable polyisocyanates for preparing the compounds containing urea and alkoxysilane groups are selected from monomeric diisocyanates, polyisocyanate adducts and NCO prepolymers. The polyisocyanates contain (cyclo) aliphatically-bound isocyanate groups and have an average functionality of 1.5 to 6. The monomeric diisocyanates and polyisocyanate adducts preferably have an average functionality of 1.8 to 6, more preferably 2 to 6 and most preferably 2 to 4. The NCO prepolymers preferably have an average functionality of 1.5 to 4.5, more preferably 1.7 to 3.5 and most preferably 1.8 to 3.2.

Suitable monomeric diisocyanates may be represented by the formula

wherein R represents an organic group obtained by removing the aliphatically- and/or cycloaliphatically-bound isocyanate groups from an organic diisocyanate having a molecular weight of about 112 to 1,000, preferably about 140 to 400. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms or a divalent araliphatic hydrocarbon group having 7 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α,α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate and mixtures thereof. Polyisocyanates containing 3 or more isocyanate groups, such as 4-isocyanantomethyl-1,8-octamethylene diisocyanate, may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane and 1-isocyanato-1-methyl-4(3)-isocyanatomethyl cyclohexane.

In accordance with the present invention the polyisocyanate component is preferably in the form of a polyisocyanate adduct. Suitable polyisocyanate adducts are those containing isocyanurate, uretdione, biuret, urethane, allophanate, carbodiimide and/or oxadiazinetrione groups. The polyisocyanates adducts, which preferably have an NCO content of 5 to 30% by weight, include:

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g, a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Iminooxadiazine dione and optionally isocyanurate group-containing polyisocyanates which may be prepared in the presence of special fluorine-containing catalysts as described in DE-A 19611849. These polyisocyanates generally have an average NCO functionality of 3 to 3.5 and an NCO content of 5 to 30%, preferably 10 to 25% and most preferably 15 to 25% by weight.

8) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

9) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, uretdione, biuret groups, iminooxadiazine dione and/or allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-$\epsilon$-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide and/or propylene oxide, which may be used in sequence or in admixture.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. Nos. 5,243,012 and 5,466,771, respectively, herein incorporated by reference.

These NCO prepolymers preferably have an isocyanate content of 0.3 to 35% by weight, more preferably 0.6 to 25% by weight and most preferably 1.2 to 20% by weight. The NCO prepolymers are produced by reacting the diisocyanates with the polyol component at a temperature of 40 to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

Suitable compounds containing ethylene oxide units, which may optionally be incorporated into the moisture-curable compounds according to the present invention, include compounds containing lateral or terminal, ethylene oxide units. Suitable compounds for incorporating lateral or terminal, hydrophilic ethylene oxide units are known and disclosed in U.S. Pat. Nos. 3,905,929, 3,920,598 and 4,190, 566 (the disclosures of which are herein incorporated by reference). Preferred hydrophilic components are the monohydroxy polyethers having terminal hydrophilic chains containing ethylene oxide units. These hydrophilic components may be produced as described in the preceding patents by alkoxylating a monofunctional starter, such as methanol or n-butanol, using ethylene oxide and optionally another alkylene oxide, for example, propylene oxide.

The moisture-curable compounds according to the invention are prepared by reacting the polyisocyanate component with the amino-functional silanes in an amount such that the moisture-curable compounds contain isocyanate groups and alkoxy groups, which are bound to Si, in an equivalent ratio of 1.0:0.05 to 1.0:1.4, preferably 1.0:0.05 to 1.0:1.2 and more preferably 1.0:0.1 to 1.0:1.0.

The compounds containing repeating ethylene oxide units are reacted with the polyisocyanates in amounts sufficient to provide the amount of ethylene oxide units previously set forth. In one embodiment of the present invention the moisture-curable compounds do not contain sufficient ethylene oxide units to be stably dispersed in water. Compounds which cannot be stably dispersed are those that do not remain mixed with water, either in the form of an oil-in-water emulsion or a water-in-oil emulsion, without settling, coagulation or separation.

The reaction is preferably carried out by incrementally adding the isocyanate-reactive compound to the polyisocyanate. The silane aspartate and the optional compound containing ethylene oxide groups may be added sequentially or in admixture. When present the compound containing ethylene oxide units is preferably added first, followed by the silane aspartate.

The compounds according to the invention can also be prepared by mixing different types of compounds, provided that they satisfy the preceding guidelines regarding the amounts hydrophilic groups, alkoxysilane groups and isocyanate groups. For example, compounds which contain alkoxysilane groups, but are free from isocyanate groups, and/or compounds which contain isocyanate groups, but which do not contain alkoxysilane groups, may be present as a portion of the compounds according to the invention.

The reaction to form the urea groups is conducted at a temperature of 10 to 100° C., preferably 20 to 80° C. and more preferably 20 to 50° C., while the reaction with the compounds containing ethylene oxide units is conducted at a temperature of 20 to 150° C., preferably 50 to 120° C. and more preferably 60 to 100° C.

In accordance with the present invention the special type of urea groups formed by the reaction of the amino-functional compounds containing alkoxysilane groups and aspartate groups with the polyisocyanate component may be converted to hydantoin groups in known manner by heating the compounds at elevated temperatures, optionally in the presence of a catalyst. Therefore, the term "urea groups" is also intended to include other compounds containing the group, N—CO—N, such as hydantoin groups.

The formation of hydantoin groups is not preferred in accordance with the present invention because this reaction also results in the formation of a monoalcohol, which will react with the isocyanate groups without chain extension. For this reason it is preferred to form the urea groups at low temperatures to avoid the formation of hydantoin groups. However, since hydantoin groups can also be formed under ambient conditions during storage, it is preferred to use the products of the invention shortly after their preparation.

The compounds of the present invention are suitable for use in one-component, coating, adhesive or sealing compositions, which can be cured in the presence of atmospheric moisture. The compositions cure by a dual cure mechanism, i.e., 1) by the reaction of isocyanate groups with moisture and
2) by "silane polycondensation" from the hydrolysis of alkoxysilane groups to form Si—OH groups and their subsequent reaction with either Si—OH or Si—OR groups to form siloxane groups (Si—O—Si) and
3) conceivably by the reaction of isocyanate groups with Si—OH groups.

Suitable acidic or basis catalysts may be used to promote the curing reaction. Examples include acids such as para-toluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula II, also accelerate hardening of the compounds according to the invention.

The one-component compositions generally may be either solvent-free or contain up to 70%, preferably up to 60% organic solvents, based on the weight of the one-component composition, depending upon the particular application. Suitable organic solvents include those which are known from polyurethane chemistry.

The compositions may also contain known additives, such as leveling agents, wetting agents, flow control agents, antiskinning agents, antifoaming agents, fillers (such as silica, aluminum silicates and high-boiling waxes), viscosity regulators, plasticizers, pigments, dyes, UV absorbers and stabilizers against thermal and oxidative degradation.

The one-component compositions may be applied to any desired substrates, such as wood, plastics, leather, paper, textiles, glass, ceramics, plaster, masonry, metals and concrete. They may be applied by standard methods, such as spray coating, spread coating, flood coating, casting, dip coating, roll coating. The coating compositions may be clear or pigmented lacquers.

The one-component compositions may be cured at ambient temperature or at elevated temperatures. Preferably, the moisture-curable resins are cured at ambient temperatures.

The invention is further illustrated but is not intended to be limited by the following examples in which all parts and percentages are by weight unless otherwise specified.

EXAMPLES

Polyisocyanate resin 1 (Comparison)

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Polyether 1

A polyethylene oxide monool prepared by the ethoxylation of methanol and having a molecular weight of 550 (available from Union Carbide as Carbowax 550).

Silane Aspartate 1-N-(3-trimethoxysilylpropyl) aspartic acid diethyl ester 1438 parts (8.27 equiv.) of 3-aminopropyltrimethoxysilane were added to a 5 liter flask fitted with agitator, thermocouple, nitrogen inlet and addition funnel with condenser. 1423.2 parts (8.27 equiv.) of diethyl maleate were added dropwise over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete. The product, N-(3-trimethoxysilylpropyl) aspartic acid diethyl ester, had a viscosity of 11 mPa.s at 25° C.

Polyisocyanate resin 2 containing silane aspartate groups 514 parts (1.46 equiv) of polyisocyanate 1 and 200 parts of n-butyl acetate were added at ambient temperature to a 2 liter flask equipped with stirrer, nitrogen inlet, heater and temperature controller. 285 parts (1.46 equiv.) of silane aspartate 1 were added dropwise as quickly as possible over a thirty minute period so as to maintain the reaction temperature below 30° C. The reaction was held at 30° C. for 4 hours until no isocyanate groups remained as determined by IR spectroscopy. After cooling the resulting product had a viscosity of 1250 mPa.s at 25° C.

Polyisocyanate 3 containing ethylene oxide groups (Comparison)

82.5 parts (0.15 equiv) of polyether 1, which had been melted at 60° C., were added to a 500 ml flask equipped with stirrer, nitrogen inlet, heater and temperature controller. 195 parts (1 equiv) of polyisocyanate 1 were then added. The reaction flask was heated to and held at 60° C. for 16.5 hours until the NCO content was 12.65% (theoretical NCO 12.88%). The resulting product had a viscosity of 2644 mPa.s at 25° C.

Polyisocyanate 4 containing silane aspartate and ethylene oxide groups 82.5 parts (0.15 equiv) of polyether 1, which had been melted at 60° C., were added to a 500 ml flask equipped with stirrer, nitrogen inlet, heater and temperature controller. 195 parts (1 equiv) of polyisocyanate 1 were then added. The reaction flask was heated to and held at 60° C. for 13 hours until the NCO content was 12.65% (theoretical NCO 12.88%). The reaction mixture was cooled to 35° C. 31.1 parts (0.85 equiv) of silane aspartate 1 were added and the reaction mixture exothermed to 43° C. The reaction was heated to and held at 60° C. for two hours. The resulting product had an NCO content of 10.18% (theoretical NCO 10.41%) and a viscosity of 4532 mPa.s at 25° C.

Polyisocyanate 5 containing silane aspartate and ethylene oxide groups 82.5 parts (0.15 equiv) of polyether 1, which had been melted at 60° C., were added to a 500 ml flask equipped with stirrer, nitrogen inlet, heater and temperature controller. 195 parts (1 equiv) of polyisocyanate 1 were then added. The reaction flask was heated to and held at 60° C. for 12.5 hours until the NCO content was 12.63% (theoretical NCO 12.88%). The reaction mixture was cooled to 35° C. 100.6 parts (0.275 equiv) of silane aspartate 1 were added and the reaction mixture exothermed to 43° C. The reaction was heated to and held at 60° C. for two hours. The resulting product had an NCO content of 5.97% (theoretical NCO 6.38%) and a viscosity of 13,500 mPa.s at 25° C.

Preparation of Films from Polyisocyanate Resins 1 and 2

Coating compositions were prepared by mixing the polyisocyanate resins 1 and/or 2 with the catalysts and solvents set forth in the following table. The compositions, which had solids contents of 80%, were applied to glass plates with a 3 mil draw down bar. Dry times were determined with a Gardner Dry Time Meter as described in the Pacific Scientific Instruction Manuals DG-9600 and DG-9300. The compositions and dry times are set forth in Table 1.

TABLE 1

| Formulation | A | B | C | D | E |
|---|---|---|---|---|---|
| Polyisocyanate 1 | 20. | 15. | 10. | 5. | 0. |
| Polyisocyanate 2 | 0. | 5. | 10. | 15. | 20. |
| Triethylene diamine | 0.01 | 0.01 | 0.01 | 0.01 | 0.01 |
| Dibutyltin Acetoacetonate | 0.01 | 0.01 | 0.01 | 0.01 | 0.01 |
| n-Butyl Acetate | 5.0 | 3.75 | 2.5 | 1.25 | 0 |

TABLE 1-continued

| Formulation | A | B | C | D | E |
|---|---|---|---|---|---|
| Si:NCO eq:eq | 0.000 | 0.116 | 0.348 | 1.044 | — |
| Alkoxy:NCO eq:eq | 0.000 | 0.348 | 1.044 | 3.132 | — |
| Dry Times, min | | | | | |
| Set to Touch | 290 | 60 | 45 | 300 | 290 |
| Sanding Dry | 420 | 120 | 90 | 360 | 420 |
| Hard Dry | >720 | 180 | 150 | >720 | >720 |

Preparation of Films from Polyisocyanate Resins 3, 4 and 5

20 g of each of polyisocyanate resins 3, 4 and 5 were mixed with 0.02 g of triethylene diamine catalyst (Dabco 33LV, Air Products), 0.02 g of dibutyltin acetoacetonate catalyst and 5 g of n-butyl acetate solvent. The resulting compositions were applied to glass plates with a 3 mil draw down bar. Dry times were determined with a Gardner Dry Time Meter as described in the Pacific Scientific Instruction Manuals DG-9600 and DG-9300. The dry times are set forth in Table 2.

TABLE 2

| | Gardner Dry Times, minutes | | |
|---|---|---|---|
| Polyisocyanate resin | Set-to-touch | Sand dry | Hard dry |
| Polyisocyanate 3 containing ethylene oxide groups (Comparison) | 70 | 240 | >360 |
| Polyisocyanate 4 containing silane aspartate and ethylene oxide groups | 25 | 45 | 60 |
| Polyisocyanate 5 containing silane aspartate and ethylene oxide groups | 60 | 90 | 150 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A moisture-curable compound which
   a) has a content of (cyclo)aliphatically-bound isocyanate groups (calculated as NCO, MW 42) of 0.2 to 30% by weight and a content of alkoxysilane groups (calculated as Si, MW 28) of 0.2 to 4.5% by weight,
   b) optionally contains repeating ethylene oxide units and
   c) has an equivalent ratio of (cyclo)aliphatically-bound isocyanate groups to alkoxy groups, which are bound to Si, of 1.0:0.05 to 1.0:1.4, wherein the preceding percentages are based on the weight of the moisture-curable compound and wherein the alkoxysilane groups are incorporated as the reaction product of a polyisocyanate with an amino compound corresponding to formula I

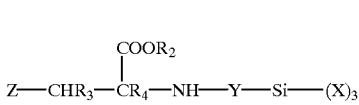

(I)

wherein
X represents identical or different organic groups which are inert to isocyanate groups below 100° C., provided that at least one of these groups is an alkoxy,
Y represents a linear or branched alkylene radical containing 1 to 8 carbon atoms, Z represents COOR, or an aromatic ring, $R_1$ and $R_2$ are identical or different and represent organic groups which are inert to isocyanate groups at a temperature of 100° C. or less and $R_3$ and $R_4$ are identical or different and represent hydrogen or organic groups which are inert to isocyanate groups at a temperature of 100° C. or less.

2. The moisture-curable compound of claim 1 wherein

X represents identical or different alkyl or alkoxy groups having 1 to 4 carbon atoms, Y represents a linear radical containing 2 to 4 carbon atoms or a branched radical containing 5 to 6 carbon atoms, Z represents $COOR_1$, $R_1$ and $R_2$ are identical or different and represent alkyl groups having 1 to 9 carbon atoms and $R_3$ and $R_4$ represent hydrogen.

3. The moisture-curable compound of claim 1 wherein

X represents identical or different alkoxy groups having 1 to 4 carbon atoms,

Y represents a linear radical containing 2 to 4 carbon atoms or a branched radical containing 5 to 6 carbon atoms, Z represents $COOR_1$, $R_1$ and $R_2$ are identical or different and represent methyl, ethyl or butyl and $R_3$ and $R_4$ represent hydrogen.

4. The moisture-curable compound of claim 1 wherein the alkoxysilane groups are incorporated as the reaction product of a polyisocyanate adduct containing isocyanurate groups, biuret groups, allophanate groups and/or uretdione groups with an amino compound.

5. The moisture-curable compound of claim 2 wherein the alkoxysilane groups are incorporated as the reaction product of a polyisocyanate adduct containing isocyanurate groups, biuret groups, allophanate groups and/or uretdione groups with an amino compound.

6. The moisture-curable compound of claim 3 wherein the alkoxysilane groups are incorporated as the reaction product of a polyisocyanate adduct containing isocyanurate groups, biuret groups, allophanate groups and/or uretdione groups with an amino compound.

7. The moisture-curable compound of claim 1 wherein the alkoxysilane groups are incorporated as the reaction product of an NCO prepolymer with an amino compound.

8. The moisture-curable compound of claim 2 wherein the alkoxysilane groups are incorporated as the reaction product of an NCO prepolymer with an amino compound.

9. The moisture-curable compound of claim 3 wherein the alkoxysilane groups are incorporated as the reaction product of an NCO prepolymer with an amino compound.

10. The moisture-curable compound of claim 1 wherein said moisture-curable compound cannot be stably dispersed in water.

11. The moisture-curable compound of claim 2 wherein said moisture-curable compound cannot be stably dispersed in water.

12. The moisture-curable compound of claim 3 wherein said moisture-curable compound cannot be stably dispersed in water.

13. The moisture-curable compound of claim 4 wherein said moisture-curable compound cannot be stably dispersed in water.

14. The moisture-curable compound of claim 5 wherein said moisture-curable compound cannot be stably dispersed in water.

15. The moisture-curable compound of claim 6 wherein said moisture-curable compound cannot be stably dispersed in water.

16. The moisture-curable compound of claim 7 wherein said moisture-curable compound cannot be stably dispersed in water.

17. The moisture-curable compound of claim 8 wherein said moisture-curable compound cannot be stably dispersed in water.

18. The moisture-curable compound of claim 9 wherein said moisture-curable compound cannot be stably dispersed in water.

19. A one-component coating, adhesive or sealant composition wherein the binder comprises the moisture-curable compound of claim 1.

* * * * *